United States Patent [19]
Mantell et al.

[11] Patent Number: 5,748,785
[45] Date of Patent: May 5, 1998

[54] INTER-SEPARATION COLOR IMAGE PROCESSING USING ERROR DIFFUSION

[75] Inventors: David A. Mantell, Rochester; Reiner Eschbach, Webster, both of N.Y.

[73] Assignee: Xerox Corporation, Stamford, Conn.

[21] Appl. No.: 720,257

[22] Filed: Sep. 26, 1996

[51] Int. Cl.$^6$ .............. G06T 5/00; H04N 1/405; H04N 1/52
[52] U.S. Cl. .............. 382/237; 382/270; 382/252; 358/534; 358/466
[58] Field of Search .............. 382/237, 270; 358/534, 535, 536, 456, 466

[56] References Cited

U.S. PATENT DOCUMENTS

| | | | |
|---|---|---|---|
| 5,045,952 | 9/1991 | Eschbach | 358/447 |
| 5,353,127 | 10/1994 | Shiau et al. | 358/458 |
| 5,375,002 | 12/1994 | Kim et al. | 358/521 |
| 5,434,672 | 7/1995 | McGuire | 358/296 |
| 5,535,019 | 7/1996 | Eschbach | 358/456 |

FOREIGN PATENT DOCUMENTS

654940A1 of 0000 European Pat. Off. .

OTHER PUBLICATIONS

Knox, Keith T. and Eschbach, Reiner, Threshold Modulation in Error Diffusion, Journal of Electronic Imaging, Jul. 1993, pp. 185–192.

*Primary Examiner*—Scott Rogers
*Attorney, Agent, or Firm*—Daniel J. Krieger

[57] ABSTRACT

A method for processing an input image including a plurality of input pixels each having a first number of possible input levels of optical density to form an output image including a plurality of separations each including a plurality of output pixels each having a second number of possible output levels of optical density. The method includes the steps of generating a first threshold reference signal as a function of the output levels of optical density of a plurality of corresponding pixels each being selected from one of the plurality of separations, modifying a current one of the plurality of input pixels in a current one of the plurality of separations in accordance with an error signal derived by processing previous ones of pixels in the current one of the plurality of separations, generating a second threshold reference signal according to the output levels of optical density of previously processed pixels in the current one of the plurality of separations, and forming one of the output pixels by comparing the modified current one of the plurality of input pixels to the generated first threshold reference signal and the generated second threshold reference signal.

20 Claims, 4 Drawing Sheets

INTER-SEPARATION COLOR IMAGE PROCESSING USING ERROR DIFFUSION

FIELD OF THE INVENTION

This invention relates generally to quantization or halftoning in a color document processing apparatus and more particularly to inter-separation color image processing using error diffusion in a printer or copier.

BACKGROUND OF THE INVENTION

The representation of continuous tone pictorial data in a binary or multilevel format is a major concern as the need increases to transmit and display images. The binary representation or multilevel representation of continuous tone image information is desired in order to reduce the sensitivity to noise in transmission and storage of the image information or to enable the accurate depiction of continuous tone originals with binary or multilevel media or devices.

In the general field of digital halftoning, different methods exist to convert continuous tone images to binary images in such a manner as to preserve the appearance of tonal gradations similar to the original image. In the digital reproduction of documents, a color separation which provides varying densities of a single primary color is combined with other separations to produce a full color image. The color separation is conveniently represented as a monochromatic bitmap, which may be described as an electronic image with discrete signals (hereinafter, "pixels") defined by a position and a density. In such a system, density is described as one level in number of possible states or levels. When more than two levels of density are used in the description of the image, the levels are often termed "gray" indicating that they vary between a maximum and a minimum, and without reference to their actual color. Most printing systems have the ability to reproduce an image with a small number of levels, most commonly two, although other numbers of levels are possible. For instance, ink jet printers typically operate with two levels while acoustic ink jet printers can operate with more than two levels.

Printing systems or display systems receive information from various input devices including document scanners, digital cameras, and computer imagery generators. These common input devices are, however, capable of describing an image with a substantially larger number of gray levels, for instance, 256 levels being a commonly selected number, although larger and smaller levels are possible. Consequently, it is necessary that an image initially described with a large set of levels be describable with a smaller set of levels in a manner which captures the information of the original image and which is satisfactory to the ultimate user. Usually in digital reproduction of color documents, this means that each of the color separations is reduced from the input number of levels to a smaller output number of levels. The multiple color separations are combined together at printing to yield the final color print. Commonly, color documents are formed using cyan, magenta, and yellow colorants or cyan, magenta, yellow and black colorants. A larger number or alternative colorants may also be used.

In printing or displaying an image, the desired density of color over an area is commonly achieved by halftoning where separation density variation is represented by placing greater or lesser numbers of ON pixels in a discrete area of the separation. In one halftoning method known as dithering or screening, over a given area having a number of gray separation pixels therein, a value representing the density of each separation pixel of an array of gray separation pixels within the area is compared to one of a set of preselected thresholds (the thresholds are stored as a dither matrix and the repetitive pattern generated by this matrix is considered a halftone cell) as taught, for example, in U.S. Pat. No. 4,149,194 to Holladay. The effect of such an arrangement is that for an area where the image is gray, some of the thresholds within the dither matrix will be exceeded i.e. the image value at that specific location is larger than the value stored in the dither matrix for that same location, while others are not. In the binary case, the separation pixels or cell elements for which the thresholds are exceeded might be printed as a maximum colorant value while the remaining separation pixels are allowed to remain white, or not printed, dependent on the actual physical quantity described by the data. The described halftoning method produces an output pattern that is periodic or quasi-periodic in the spatial coordinates.

Error diffusion is another halftoning method and is taught in "An Adaptive Algorithm For Spatial Gray Scale" by Floyd and Steinberg, proceedings of the SID 17/2, 75 to 77 (1976). Another, more elaborate method, is the error diffusion techniques of U.S. Pat. No. 5,045,952 to Eschbach, which provides image dependent edge enhancement, assigned to the same assignee as the present invention. In addition, U.S. Pat. No. 5,353,127 to Shiau describes error diffusion using various schemes for distribution weightings of error and is herein incorporated by reference. Error diffusion attempts to accurately reproduce gray by making a conversion from gray pixels to binary or multilevel pixels on a pixel-by-pixel basis. Error diffusion examines each pixel with respect to a threshold, and the difference between the gray level pixel value and the output value is forwarded to a selected group or set of neighboring pixels in accordance with a weighting scheme. The output binary pattern of the error diffusion algorithm and its derivatives provides a pattern with a local periodicity related to the input level but with no global periodicity. See "Analytic Description of the 1-D Error Diffusion Technique for Halftoning," Optics Communications, Volume 52, No. 3, 165–168 (1984) by R. Eschbach and R. Hauck.

Dithering creates problems in color document reproduction where the repeating pattern of the screen throughout the image when superimposed over similar repeating patterns in multiple separations can cause moiré or other artifacts, particularly in printing systems with less than ideal registration between separations.

Error diffusion, on the other hand, is an adaptive method that adjusts to the input data. Consequently, error diffusion can be considered non-periodic which tends to reduce the problems of moire. Since error diffusion is a deterministic process, however, registration of the different deterministic color separations can lead to a color shift as a function of the physical offset is between the different separations. Such a color shift can be reduced by introducing a random element into the error diffusion process but at the expense of image noise.

Various apparatus and methods for generating images on a recording medium or otherwise with an error diffusion algorithm are described in the following disclosures which may be relevant to certain aspects of the present invention.

U.S. Pat. No. 5,045,952 to Eschbach, describes a method of dynamically adjusting the threshold level of an error diffusion algorithm to selectively control the amount of edge enhancement induced into an encoded output. The threshold level is selectively modified on a pixel-by-pixel basis.

U.S. Pat. No. 5,353,127 to Shiau et al. describes a method for quantizing gray level pixel data with an extended distribution set. Various schemes for distribution weightings of errors is disclosed.

U.S. Pat. No. 5,375,002 to Kim et al. describes an error diffusion circuit and a method for adaptively compensating for the distortion of brightness in color with respect to neighboring pixels. An error diffusion circuit includes a color determining portion for adding CMY signals to a diffusion error to generate a current pixel value, comparing the current pixel value with sequentially supplied error lookup data to determine an address of error lookup data having the smallest error as output pixel color information, and applying the output pixel color information to the printer.

U.S. Pat. No. 5,434,672 to McGuire, describes a pixel error diffusion method. Error distribution in printing and information processing systems is accomplished according to combined internal and external superpixel error diffusion techniques. For a particular superpixel, the error amounts of a selected internal subject pixel are provided to another internal subject pixel until a determined or selected final pixel error value within the selected superpixel has been determined. The final internal error value is distributed among selected superpixels within a predetermined superpixel neighborhood.

U.S. Pat. No. 5,536,019 to Eschbach, describes an error diffusion halftoning with homogeneous response in high/low intensity image regions. The method and apparatus quantizes pixels in an image formed of a plurality of pixels, each pixel constituting an image signal representing optical density of the image at a location therein. During quantization, a threshold signal for quantization determination is dynamically adjusted in accordance with previous output quantization determinations and local input determinations to selectively control the likelihood of whether the next pixel will exceed the threshold.

EP-A-654 940 A1 to Klassen et al. describes a method and apparatus for vector error diffusion with output color control. The method controls the output colors while reducing the visibility of the error diffusion pattern inherent in forming a bilevel image.

"Threshold Modulation In Error Diffusion" by Knox and Eschbach, Journal of Electronic Imaging, July 1993, Volume 2, pages 185–192, describes a theoretical analysis of threshold modulation in error diffusion. Spatial modulation of the threshold is shown to be mathematically identical to processing an equivalent input image with a standard error diffusion algorithm.

SUMMARY OF THE INVENTION

In accordance with one aspect of the present invention, there is provided a method for processing an input image including a plurality of input pixels each having a first number of possible input levels of optical density to form an output image including a plurality of separations each including a plurality of output pixels each having a second number of possible output levels of optical density. The method includes the steps of generating a first threshold reference signal as a function of the output levels of optical density of a plurality of corresponding pixels each being selected from one of the plurality of separations, modifying a current one of the plurality of input pixels in a current one of the plurality of separations in accordance with an error signal derived by processing previous ones of pixels in the current one of the plurality of separations, generating a second threshold reference signa, and forming one of the output pixels by comparing the modified current one of the plurality of input pixels to the generated first threshold reference signal and the generated second threshold reference signal.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
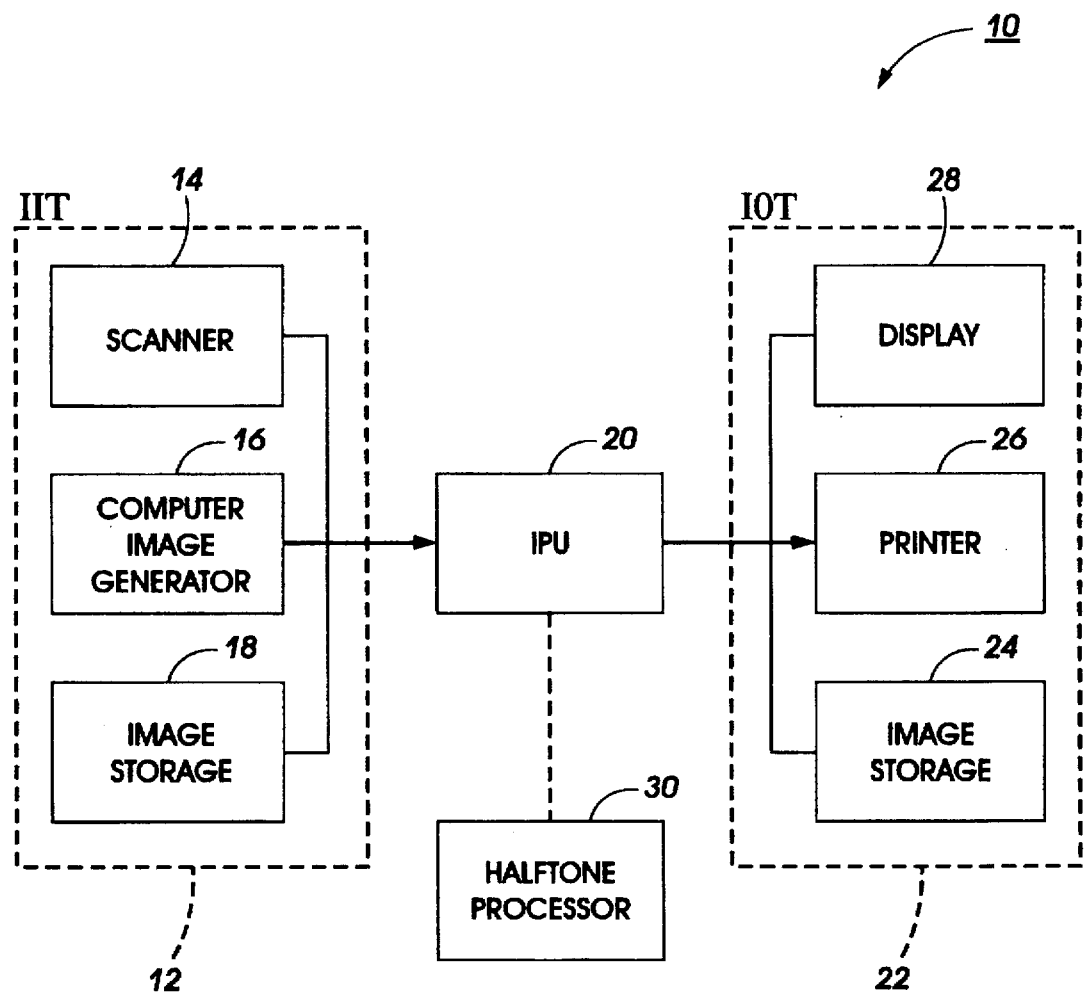
FIG. 1 is a simplified schematic block diagram illustrating an image producing system in which the present invention may be applied.

FIG. 1 illustrates a basic image processing system 10. In the system 10, an electronic representation of a document (hereinafter, an image), from an image input terminal 12 derives electronic digital data in some manner from an original image or other source, in a format related to the physical characteristics of the device typically including pixels divided at m bits per pixel. Typical image input terminals include a scanner 14, a computer image generator 16 and an image storage device 18. Common color scanners, such, for example, Xerox 5775 digital color copiers, or the Pixel Craft 7650 C, produce 8 bits per pixel data at resolutions acceptable for many purposes. The electronic digital data signals, transmitted through an image processing unit 20, are processed for suitable reproduction on an image output terminal 22 which can include an image storage device 24, a printer 26 and a display 28. The printer 26 can include many types of digital image generating printers including xerographic printers, and liquid ink printers, such as continuous stream or drop on demand including piezoelectric, acoustic, phase change wax based, or thermal. Likewise, the display 28, not only includes cathode ray tube types of displays but also LCD displays and other image displays. Image processing unit 20 includes a halftone processor 30 which converts m bit digital image signals to n bit digital image signals, suitable for reproduction by the image output terminal 22, where m and n are integer values.

As used herein, a "pixel" refers to an image signal associated with a particular position in an image having an optical density between a minimum and a maximum. Accordingly, pixels are defined by intensity and position. The pixels may refer to a particular position, region, or superpixel (collection of pixels) in the output image. The image data pixels are commonly grouped into separations. Each separation provides a set of image signals or separation pixels. These might be used to drive a printer to produce one color separation of the image. In the case of multi-color printers, these separations, superimposed together, form the color image. In this context, pixels are described as discrete image signals which represent optical density of the document image in a given small area. In this description, the term gray will be used for a pixel values which vary between maximum and minimum, irrespective of the color of the separation in which the signals are used. In addition, the present invention is not limited to a color space using cyan, magenta, yellow, and black but also other color spaces such as color spaces having more than 4 colorants, often referred to as HiFi color, other common color spaces, such as r,g,b, or color spaces such as those including luminance, chroma, and hue wherein the present invention could be used to enhance the luminance signal or any other space or separation.

Before describing an embodiment of the invention, the principals of the invention will be discussed. In the inventive improved inter-separation control in a color error diffusion process and circuit described herein, a color image is processed according to a modified error diffusion algorithm using cross-separation control using threshold imprints. Error diffusion algorithms are deterministic algorithms as described above. This means that for certain correlations of the image data in the different separations, certain other correlations might appear in the output of the error diffusion algorithm for those separations. This can easily be understood considering the following example: assume two separations, each having an input intensity of ¼. Correspondingly, the output for each separation after error diffusion will have one-in-four pixels switched on. Both separations are deterministic (excluding the error diffusion algorithms that inject noise into the system as described earlier) and, assuming for the moment that the error diffusion algorithm is the same for both separations, both are also represented by the identical output pattern. If both separations are now printed in perfect alignment—0 physical shift—the printed spots will always coincide. If they are printed at a different physical shift, the printed spots will always be next to each other. The color of those two imaginary patches, at shift equal zero and at shift not equal zero, will be different, since real inks and toners always have unwanted absorbtions, e.g.: the cyan ink will always absorb some magenta. It should be noted that the basic principle of the description holds, even if different error diffusion algorithms, or different settings of the error diffusion algorithm are used for the different separations.

When the input values for the two color separation are close, the output can show low frequency beating patterns. In particular, when dots print out in adjacent pixel locations the overall dot looks bigger, degrading image quality. Ideally, we want them to either print pixels on top of each other or preferably to separate the pixels on the page for the best possible image quality.

In order to prevent the separations from seemingly randomly align with each other causing artifacts, an interaction between the different separations is required. One way to accomplish this is by using a vectorial error diffusion algorithm that does not process individual separations but rather treats the color of a pixel as a multidimensional vector, as described in the co-pending patent application "Method and Apparatus for Vector Error Diffusion with Output Color Control" to Klasssen et al., Ser. No. 144, 478, filed Nov. 11, 1993. The interaction between the different separations requires some kind of information exchange between the planes, which in the present invention is done in by using a threshold imprint that is a function of the color of the printed output pixel in the print/no-print decision of subsequent pixels.

In particular, in order to improve print quality in an ink-jet printer, the overlap of ink drops in the different color planes has to be controlled. Because the colors are printed in swaths with the colors printed nearly simultaneously or in quick succession, for ink jet applications it is desirable to process the color planes simultaneously. The present invention can be used advantageously in this case since no or very little additional data has to be stored. Having all the color information for a pixel available enables the creation of a combined threshold imprint (i.e. a modification to the threshold level required for the pixel to print) for the current pixel from the weighted sum of the C, M, Y and K threshold imprint functions. This algorithm and apparatus therefore, has some properties that further reduce worms even for the very lightest and darkest levels as will be described later.

In order to understand the concept behind the cross-separation correlation control using threshold imprints, initially, the threshold imprint method will be described as it can be used to influence the output state clustering of an individual separation in corporating U.S. Pat. No. 5,536,019 to Eschbach by reference. The present invention further improves upon threshold imprints by generating a threshold imprint for the current pixel by processing the threshold imprints from a weighted sum of the color components of the pixel value, and in the most common implementation by the weighted sum of the C, M, Y, and K threshold imprint functions.

Referring to U.S. Pat. No. 5,536,019, a simple way to discourage the clustering of like pixels (color or white) is to raise the threshold when a white pixel is set, and to lower the threshold when a color pixel is set. This in itself, however, is not sufficient to generate a homogeneous pulse distribution. Rather the raising or lowering of the threshold has to change the probability of color/white pixels in accordance with the local input value, i.e., a white pixel in a region of ¼ intensity should reduce the possibility of another white pixel being set for 3 neighboring pixels, and a white pixel in a region of ¹⁄₁₀ intensity should reduce the possibility for 9 neighboring pixels.

One way to implement the threshold change is to generate the threshold imprint or stamp function. The threshold imprint is a function which influences the thresholds of adjacent pixels according to the value of the local input and output pixels. One way to generate a threshold imprint over a 2-dimensional area is to generate a 1-dimensional imprint along the scanline when the scanline is processed. When processing the next scanline, the dampened threshold array of the previous scanline is used as the initial threshold values for the current scanline. The dampening guarantees, that the effect of an imprint is reduced/dampened over a number of scanlines, so that the relationship is given by:

threshold(n,l)=Dxthreshold(n,l−1)

where

D is the dampening coefficient

It should be noted, that this threshold array is subsequently modified during processing by the imprints generated in the current scanline.

As mentioned, it is desirable that the imprint influences a neighboring area as a function of the local intensities, i.e., an imprint for a white pixel in an area of ¹⁄₁₀ intensity should influence an area of 9 neighboring pixels. In order to make the imprint influence a larger or smaller area dependent on input level, one can make the size and form of the imprint be a function of intensity. Here, size refers to the physical size in pixels of the imprint and form refers to the actual form of the imprint within that size. For instance, an imprint can have a size of 10 pixels in the form of a gaussian. As an alternate method, one can make the strength of the imprint a function of the intensity, keeping size and form constant. This means that the strength of the imprint for a white pixel in an intensity of 1/10 is larger than the strength of the imprint for a white pixel at intensity 1/5. Inside the process, this can be done by multiplying the imprint template by a number taken from a table that is dependent on the local intensity. For simplicity, a simple method uses only current input intensity as indication of the local intensity. This means, that the different imprints vary in amplitude, but not in size or form.

One approach to controlling pixel distribution among color separations is described in entitled "Multiple Separation Error Diffusion, With Cross Separation Correlation Control For Color Images", to Eschbach, having a filing date of Dec. 6, 1994, assigned to Xerox Corporation, herein incorporated by reference. This approach uses a threshold imprint which is modified and carried sequentially from one color plane to the next. The threshold imprint is a modification to the threshold at which the decision is made to print a pixel. Although this method attempts to control the correlation of the different color separations, it suffers from the sequential nature in which the color separations are processed. In the referenced invention, the first separation is processed in a manner unaware of the other separations and subsequent separations have to allocate their print pixel positions into locations not occupied by the first separation. This problem worsens for the third and fourth separation where 2 and other output patterns are already fixed, respectively. The current approach uses the imprint also to improve on the distribution of color pixels from one color plane to another in the lightest and darkest regions.

Inter-separation color processing between all of the separations is obtained by generating a threshold imprint of the output of all of the separations and using the weighted sum of all of the threshold imprints in the halftoning calculation for the current pixel. In this way, it is possible that a pixel from the first separation is influenced by pixels printed in the other separations, therebye giving the present invention a more balanced capability than shown in the reference. This balanced interaction between the planes also enables a strongly improved highlight and shadow reproduction for the presented method.

Figure 2:
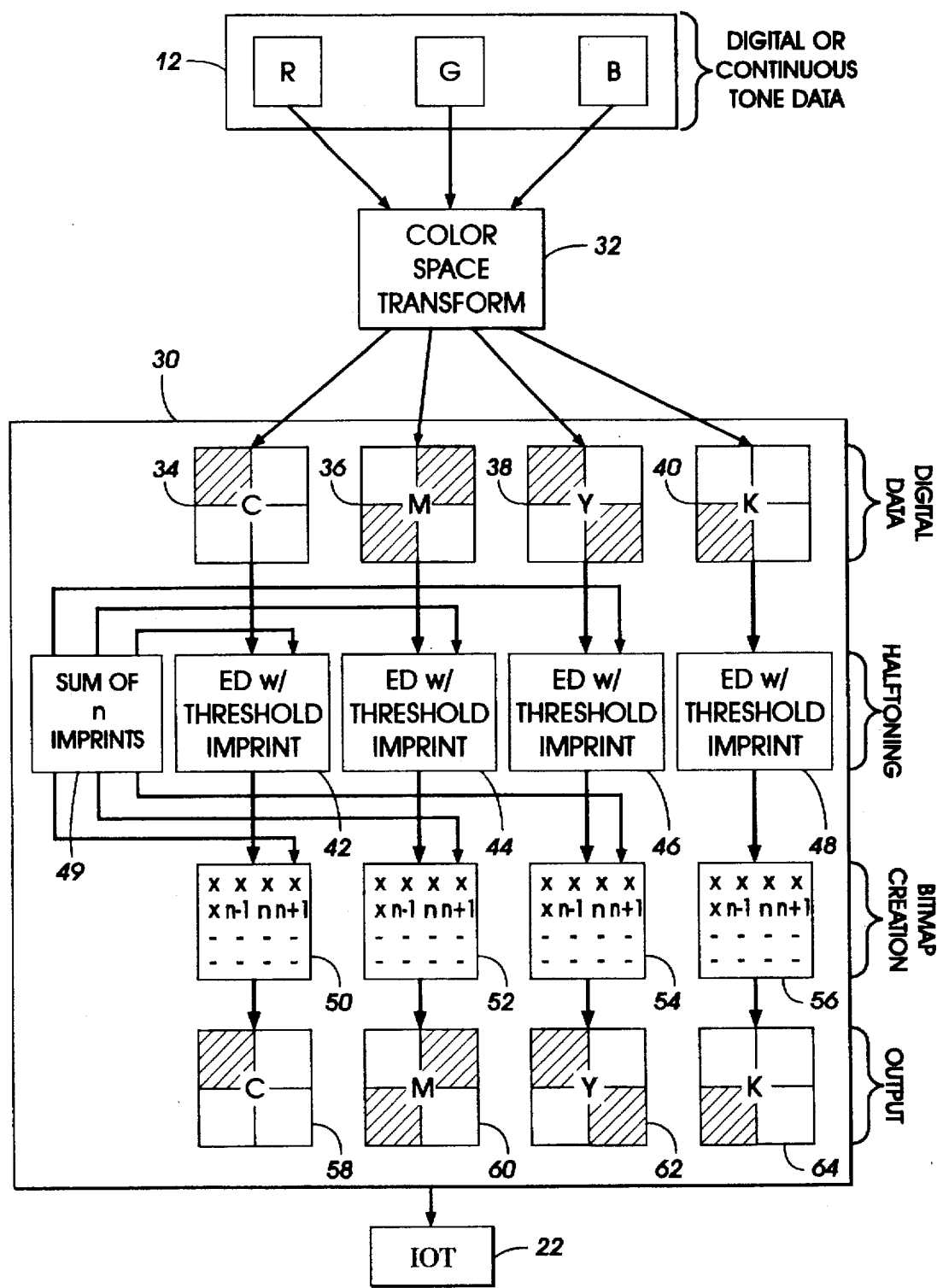
FIG. 2 illustrates a schematic block diagram of the inter-separation color image processing apparatus of the present invention.

FIG. 2 illustrates the present invention as applied to a C, M, Y, and K color space which is particularly applicable in common printers, including liquid ink printers. The IIT 12 typically generates R, G, and B or any other three component color space information. A color space transformation is made by a color space transform 32 which is typically performed by a software implementation but which can also be embodied in either hardware of hardware/software. The color space transform 32 generates a plurality of bitmaps including in this example, a cyan bitmap 34, a magenta bitmap 36, a yellow bitmap 38 and a black bitmap 40, each of which is transmitted to and transformed by the halftone processor 30. The halftone processor 30 applies error diffusion with threshold imprinting to each of the bitmaps 34, 36, 38, and 40 through the application of error diffusion/threshold imprint processors 42, 44, 46, and 48 here illustrated separately, but which can be embodied as well in a single apparatus or software package.

Each of the processors 42, 44, 46 and 48 processes the pixels in a given C, M, Y, and K image separation. Before processing a given pixel in the any one of the image separations, a weight sum of the threshold imprint functions added to the actual threshold for the current pixel being processed. The weight sum from each of the color planes is computed from the threshold imprint functions of a predetermined neighborhood from each of the color planes. This sum is then used for all the color planes. The following equations apply:

$$T_{current} = T_N + T_{adjust}$$

$$T_{adjust} = (w_c T_{cyan} + w_m T_{magenta} + w_y T_{yellow} + w_k T_{Black})$$

where $T_N$ can include a constant, a threshold imprint for the current separation, or is dependent on the input such as in edge enhancement, for instance described in U.S. Pat. No. 5,045,952 to Eschbach, herein incorporated by reference. The factors $w_i$ are the weighting functions or adjustment factors and $T_i$ are the threshold imprints for the current pixel. The threshold, $T_{adjust}$, is computed only once for a given corresponding pixel location, before processing any of the color planes.

For instance, in FIG. 2, the pixel locations of intermediary bitmaps 50, 52, 54, and 56, which are in the process of being created, illustrates that pixel locations marked with an x have been determined, that locations marked with a "dash" have not been processed, and pixel locations of n−1, n, and n+1 illustrate pixel locations of current interest. A current pixel, n, being processed, for instance in bitmap 54, would have the threshold thereof calculated with the threshold imprints for each of the pixels, n, of each of the bitmaps 50, 52, and 54 being added thereto.

In the examples shown here, the processing direction is KYMC wherein zero weight is used for the black plane and each of the colors are weighted the same ($w_n = 0.5$) as follows:

$$T_{adjust} = \frac{1}{2}(T_{cyan} T + T_{magenta} + T_{yellow})$$

Note that this processing order does not influence the decision at the current pixel due to the pre-calculation of the threshold imprint.

Note that for each color n, $T_{adjust}$ is added to the $T_n$ already used to separate pixels within the individual color plane. This assumes that the desired grays in the highlights with CMY pixels alone can be produced. If K pixels are included in the highlights then the K pixels would also need to be included in the weighted sum. It is also possible to form other weightings of the colors. For example, darker colors such as magenta and cyan could be weighed more heavily than the lighter color yellow.

Once the processing is complete for a swath of the image, completed C, Y, M, and K bitmaps 58, 60, 62, and 64 are generated and transmitted to the IOT 22 for printing or display.

In order to completely separate colors and suppress different color pixels from printing on top of each other, another adjustment can be made to the threshold. This additional adjustment is made when a pixel is printed at a given location to suppress subsequent colors from printing on the same location. This is where the order of processing becomes relevant.

In another embodiment of the present invention, the threshold imprinting of U.S. patent application Ser. No. 08/350,365 to Eschbach, mentioned earlier, is used. The threshold only interacts at the current pixel position. For black, which is processed first, the threshold is unaffected. For the next pixel $T_{adjust} = C$ K:black $T_{adjust} = -C/2$ K:white If K was black $T_{adjust}$ will stay at C. If K was white $T_{adjust}$ will stay $-C/2$ until a color pixel is printed. Then $T_{adjust}$ becomes $T_{adjust} = C/2$ K:white, and CM or Y prints with C being set to 64.

Thereafter, $T_{adjust}$ remains at C/2. The difference between the value of $T_{adjust}$ after a black pixel is printed is to discourage the colors from printing under black pixels while allowing two color pixels to print on the same location in shadow regions. Of course, other values besides C, –C/2, and C/2 could be used with good results.

All other parts of the standard error diffusion algorithm remain unchanged. The examples shown use the identical error diffusion weights as suggested by Floyd and Steinberg. Also, modifications like U.S. Pat. No. 5,045,952 and others are straightforward to implement in conjunction with the invention, as are modifications of the error calculation and weight allocation taught, for example, in U.S. patent application Ser. No. 07/672,987 (with a counterpart application published in Japan at JP-A1 4-328957), entitled "Method for Image Conversion with Application of Multiple Error Diffusion Matrices", by Eschbach, U.S. Pat. No. 4,924,322 to Kurosawa et. al., U.S. Pat. No. 4,339,774 to Temple, U.S. Pat. No. 4,955,065, to Ulichney and U.S. patent application Ser. No. 08/167,758 by Shiau et al.

The present invention is equally applicable to liquid ink devices as well as to other color printing application such as xerography. First, in liquid ink devices, the amount of ink at any pixel location should be controlled to reduce ink running and paper curl. Second, in color printing applications, the inks or toners used for printing are non-ideal insofar that the absorption spectra of the different inks/toners are partially overlapping. Depending on the actual correlation between the different color separations, color shift occurs. This can be minimized using a random, or quasi-random correlation, as it can be achieved using rotated dot schemes. In active algorithms, such as error diffusion, however, the proper color stability is often obtained by adding noise to the system, so that the different separations do not correlate in phase over a relatively large area and then out-of-phase for the next area. Adding noise, however, can reduce the overall image quality of the output. Allowing the inter-separation correlation control enables a control of the pixel overlaps and consequently reduces color shifts.

Figure 3:
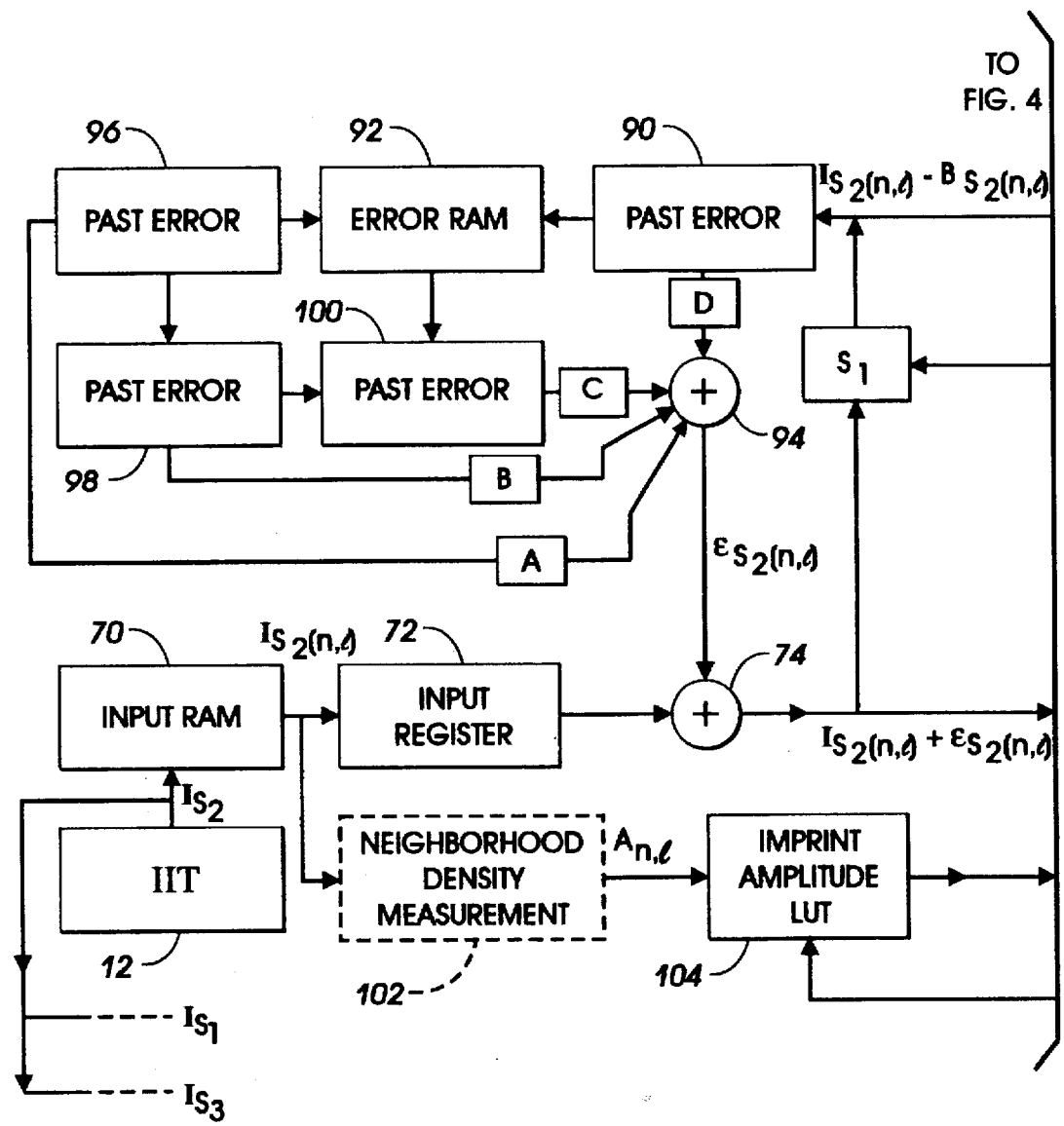
FIG. 3 and 4 illustrate together an error diffusion circuit useful in the present invention.
Figure 4:
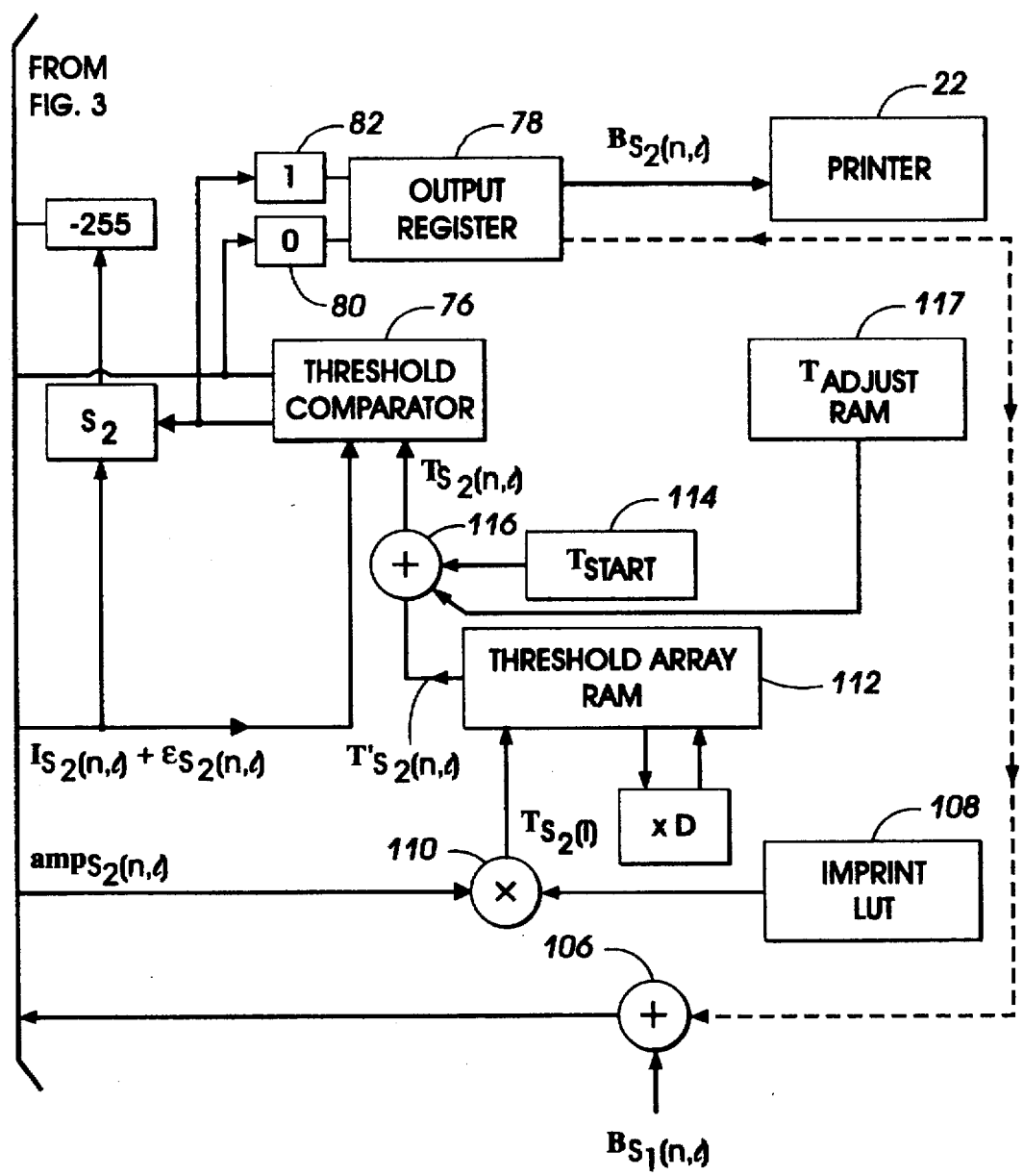

FIGS. 3 and 4 together illustrate a possible implementation of the error diffusion portion of this invention. There may be a number of error diffusion circuits corresponding to the number of separations to be processed, or there may be a single circuit which is used plural times for plural separations. The illustrated embodiment assumes multiple circuits. Thus, for a four separation system essentially identical circuits S1, S2 (shown), S3, and S4 are provided, where S corresponds to a separation. A stored array of input image signals representing a single separation $l_{S2}$ stored at input RAM 70, which may be from any image input device 12 operated in accordance with suitable driver software or computer generated representations, directs input image $l_{S2}$ into the system on a signal by signal basis, where n,l represents the position of a single separation image signal $l_{S2}(n,l)$ in a stream of image signals. Such gray level signals or pixels, generally defined as multi bit or N bit values, which defines $2^N$ or 'c' possible levels of optical density. Initially, a single signal $l_{S2}(n,l)$ is stored from input RAM or other storage device 70 suitable for holding a portion of image $l_{S2}$ to an input register 72 which is a storage device suitable for storing such a multi-bit signal. Each input signal, stored at input register 72, has a corresponding error correction signal $\epsilon$ added to the image signal l at signal adder 12 where $\epsilon_{S2}(n,l)$ is a sum of weighted error term signals of previous pixels to be added to $l_{S2}(n,l)$, resulting in a modified image signal. The modified image signal, the sum of the input image signal and the error correction signal of previous pixels ($l_{S2}(n,l)+\epsilon_{S2}(n,l)$), is passed to threshold comparator 76, where it is compared to the threshold signal T generated in accordance with the invention, to determine the corresponding output state $d_i$, where the drawing shows the case for two output states $d_1$ and $d_2$ for simplicity, although more output levels are possible. States $d_1$ and $d_2$ correspond to an appropriate output signal $B_{S2}(n,l)$ for pixel $l_{S2}(n,l)$, such as, for example, for a binary output printing system, a spot or no spot. Responsive to this comparison, if the signal $l_{S2}(n,l)+\epsilon_{S2}(n,l)$ is greater than the reference, then an image signal representing a single "set" or colored spot, or black in the case of C, M, Y, and K, is directed to output register 78 from RAM memory 82. If responsive to this comparison, signal $l_{S2}(n,l)+\epsilon_{S2}(n,l)$ is less than the reference, then an image signal representing a single black spot is directed to output register 78 from memory 80. If a black pixel is directed to output register 78, switch S2 is enabled to allow the modified input image signal $l_{S2}(n,l)+\epsilon_{S2}(n,l)$ to be stored to error register 90 without alteration. If a set pixel is directed to output register 78, switch $S_2$ is enabled to allow the modified input image signal $l_{S2}(n,l)+\epsilon_{S2}(n,l)$ to be stored to error register 90, after having a value equal to set (255 in the 8 bit case) subtracted from the signal. Pixels stored to output register 90 are eventually directed to output device 22. In the present case, where $l_{S2}$ represents a single separation of an image, with or without further correlation processing, the separation may be printed at a color printer such as the Hewlett Packard 1200C Ink Jet Color Printer, the Xerox 5775 Digital Color, or the Xerox 4700 Color Printer.

Error determined in the quantization of pixels is stored at error RAM 92, until an image signal which requires the addition of error passes through the system. Then, the portion of the stored errors from previous quantization is directed to adder 94 from past error registers 96, 98, and 100 and error register 90. Error registers 96, 98, and 100 are connected to allow the error signal to be shifted from register to register as a line of data is directed through the described system. Error signals are directed through multipliers is A, B, C and D, respectively, in accordance with Floyd and Steinberg type error diffusion, with a weighting scheme selected as desired. Note that the use of four error signals is for illustrative purposes only and that lesser or larger numbers might be used in the actual implementation. Signal adder 94 produces signal $\epsilon_{S2}(n,l)$ to be added to $l_{S2}(n,l)$, resulting in a modified image signal. The modified image signal, the sum of the input image signal and the error correction signal of previous pixels is given by ($l_{S2}(n,l)+\epsilon_{S2}(n,l)$). Note also the weighting function described in U.S. patent application Ser. No. 08/167,758 by Shiau et al. filed Dec. 15, 1993, which could be directly substituted into this arrangement.

Returning to FIGS. 3 and 4, neighborhood density measurement 102, produces a measurement of image density over an area of the image separation $l_{S2}$ and operates on measured density to produce a signal $A_{S2}(n,l)$ reflecting how strongly the threshold will be changed. For simplicity, this area can be optionally reduced to encompass only the current pixel. This is an optional step which is not always necessary. Preferably, the neighborhood density measurement effects only that portion of the threshold setting process which is attributable to the current separation.

At imprint amplitude LUT 104, the signal $A_{S2}(n,l)$ is used, together with the signals from the output registers 78 of the current pixel, n, and all previous separations (in this example, from separations $S_1$, $S_2$, and $S_3$) as an index to a table of imprint amplitude values to generate an amplitude signals $amp_{S2}(n,l)$. In an example case, the signals from output register 78 of S2 and $S_2$ are simply added, for example at adder 106, however, this is not required. In cases where no spot control from the current separation is used, only the signal from output register 178 of the previous separation is used.

At imprint LUT 108, imprints are stored for use in the system. Typically, there will be a series of digitally stored values that determine the form of the actual imprint by giving the relative imprint amplitude levels along with an indication of the imprint center:

Template: {0.05, 0.25, 0.55, 0.75, 0.9, 1.0, 1.1, 1.0, 0.9, 0.75, 0.55, 0.25, 0.05} where 1.1 is the center pixel. Several different implementations can be used to define the imprint center pixel. In symmetric imprints, the first pixel can be designated center pixel and out previous template would be stored as:

Template: {1.1, 1.0, 0.75, 0.55, 0.25, 0.05}

In such a case, all pixels (n+i, 1) with positive indices i are taken directly from the table, whereas all pixels (n+i,l) with negative indices i use the absolute value of i as an index into the table.

An alternate method is to designate a specific table value to define the center of the imprint. Using a designated value of 1.0 for the center, the original template rounded to two decimals would be stored as:

Template: {0.05, 0.23, 0.5, 0.68, 0.82, 0.91, 1.0, 0.91, 0.82, 0.68, 0.5, 0.23, 0.05}

Another alternate method would use the center pixel of the imprint LUT as the center of the imprint.

Signals obtained from imprint LUT 108 are multiplied by signals from the imprint amplitude LUT 104, at signal multiplier 110, to produce threshold correction signals $T_i$. Signals $T_i$ are added to the threshold signals T'(n,l) in threshold array 112.

Threshold Array RAM 112 is initially cleared and the first pixel is threshold T(1,1) is generated by adding the current threshold to the first element of the threshold array T'(1,1) RAM 112 to the initial threshold $T_{start}$ from RAM 114 at adder 116 which is equivalent to a preselected value derived according to observed data. The first output pixel B(1,1) is generated using threshold T(1,1), setting the output register 78. In response to imprint amplitude LUT 104, an imprint is generated via imprint LUT 108 and multiplier 110, changing the first element of the threshold array T'(1,1). Assuming, for illustrative purposes, the threshold imprints $T_i=T_{-2},T_{-1}, T_0, T_2$, the first threshold element T'(1,1) of threshold array RAM 112 is changed to T'(1,1) =$T_0$, the second element T'(2,1) is changed to T'(2,1)=$T_1$, etc. The threshold for the second input pixel T(2,1) is then calculated as T(2,1)=$T_{start}$+ T(2,1) +$T_{adjust}$=$T_{start}$+$T_1$+$T_{adjust}$ $T_{adjust}$ is derived from the threshold imprints of the first pixel of all separations. These threshold imprints are stored in a $T_{adjust}$ RAM 117. This threshold $T_{S2}$(2,1) is used to generate the second output pixel B(2,1). In response to the second output pixel B(2,1) new imprint amplitudes $U_i$ are generated at LUT 104. Assuming, for illustrative purposes, the threshold imprints $U_i=U_{-2}, U_{-1}, U_0, U_1, U_2$, and the threshold RAM 112 is changed by changing T'(1,1) to $T_{S2}$'(1,1)=$T_0$+$U_{-1}$, T'(2,1) to T'(2,1)=$T_1$+$U_0$, and T'(3,1) to T'(3,1)=$T_2$+$U_1$, etc. The new threshold for input pixel l(3,1) is then calculated as T(3,1) =$T_{start}$+T'(3,1).

After completion of the scan line threshold array RAM 112 is loaded with the initial thresholds for the new scanline. In a simple implementation, the new threshold values T'(m+1,n) are derived via T'(m+1, n)=DxT'(m, n). Note that the physical memory size for this operation needs only to encompass one scanline, making it possible for T'(m+1, n) and T'(m, n) to use the same RAM.

In an alternate implementation, the initial thresholds for the new scanline are formed as a weighted sum of the final thresholds of the previous scanline, T'(m+1,n)=T'(m,n)+aT'(m,n-1)+bT'(m,n+1)+...

It will no doubt be appreciated that the present invention may be accomplished with either software, hardware or combination software-hardware implementations.

While the embodiments disclosed herein are preferred, it will be appreciated from this teaching that various alternatives, modifications, variations or improvements therein may be made by those skilled in the art, which are intended to be encompassed by the following claims. For instance, the present invention is not limited to only copying machines and printing machines of all types but also includes display devices such as cathode ray tube, light emitting diode displays, liquid crystal displays, and any display displaying images using multi-level output pixels. In addition, the present invention, is not limited to error diffusion, but to other image processing methods and apparatus which use feedback and thresholding to alter an image. Accordingly, the present invention is intended to embrace all such alternatives, modifications, and variations that fall within the spirit and broad scope of the appended claims.

What is claimed is:

1. A method for processing an input image including a plurality of input pixels each having a first number of possible input levels of optical density to form an output image including a plurality of separations each including a plurality of output pixels each having a second number of possible output levels of optical density, comprising:

generating a first threshold reference signal as a function of the output levels of optical density of a plurality of corresponding pixels each being selected from one of the plurality of separations;

modifying a current one of the plurality of input pixels in a current one of the plurality of separations in accordance with an error signal derived by processing previous ones of pixels in the current one of the plurality of separations;

generating a second threshold reference signal; and forming one of the output pixels by comparing the modified current one of the plurality of input pixels to the generated first threshold reference signal and the generated second threshold reference signal.

2. The method of claim 1, wherein said second generating step comprises generating a second threshold reference signal according to the output levels of optical density of previously processed pixels in the current one of the plurality of separations.

3. The method of claim 2, wherein said first generating step comprises generating the first threshold reference signal as a function of a threshold adjustment signal.

4. The method of claim 3, wherein said first generating step comprises generating the threshold adjustment signal as a function of a plurality of threshold imprint signals, each of the plurality of threshold imprint signals corresponding to one of the plurality of corresponding pixels from each of the plurality of separations.

5. The method of claim 4, wherein said first generating step comprises generating the threshold adjustment signal by summing the plurality of threshold imprint signals and multiplying the sum by an adjustment factor.

6. The method of claim 5, wherein said first generating step comprises setting the adjustment factor to a value of one-half.

7. The method of claim 5, wherein said forming step comprises forming one of the output pixels by comparing the modified current one of the plurality of input pixels to the generated threshold adjustment signal and the generated second threshold value.

8. The method of claim 7, wherein said forming step comprises forming one of the output pixels by summing the generated threshold adjustment signal to the generated second threshold value.

9. The method of claim 8, wherein said generating step comprises generating the first threshold reference signal as a function of the output levels of optical density of the plurality of corresponding pixels selected from a cyan, magenta, and yellow separation.

10. The method of claim 9, wherein the first number of possible input levels is greater than the second number of possible output level.

11. The method of claim 8, wherein said generating step comprises generating the first threshold reference signal as a function of the output levels of optical density of the plurality of corresponding pixels selected from a red, green, and blue separation.

12. The method of claim 8, wherein said generating step comprises generating the first threshold reference signal as a function of the output levels of optical density of the plurality of corresponding pixels selected from four or more separations.

13. The method of claim 4, wherein said first generating step comprises generating the threshold adjustment signal by multiplying each of the plurality of threshold imprint signals by an adjustment factor.

14. The method of claim 13, wherein said first generating step comprises generating the threshold adjustment signal by multiplying each of the plurality of threshold imprint signals by a different adjustment factor.

15. The method of claim 14, wherein said forming step comprises forming one of the output pixels by comparing the modified current one of the plurality of input pixels to the generated threshold adjustment signal and the generated second threshold value.

16. The method of claim 15, wherein said forming step comprises forming one of the output pixels by summing the generated threshold adjustment signal to the generated second threshold value.

17. The method of claim 16, wherein said generating step comprises generating the first threshold reference signal as a function of the output levels of optical density of the corresponding pixel selected from a cyan, magenta, and yellow separation.

18. The method of claim 17, wherein the first number of possible input levels is greater than the second number of possible output level.

19. The method of claim 16, wherein said generating step comprises generating the first threshold reference signal as a function of the output levels of optical density of the plurality of corresponding pixels selected from a red, green, and blue separation.

20. The method of claim 16, wherein said generating step comprises generating the first threshold reference signal as a function of the output levels of optical density of the plurality of corresponding pixels selected from four or more separations.

* * * * *